US008839395B2

(12) United States Patent
Poliashenko et al.

(10) Patent No.: US 8,839,395 B2
(45) Date of Patent: Sep. 16, 2014

(54) SINGLE SIGN-ON BETWEEN APPLICATIONS (75) Inventors: Maxim Poliashenko, Marietta, GA (US); Robert Baumann, Sparks, NV (US)

(73) Assignee: CCH Incorporated, Riverwoods, IL (US)

( * ) Notice: Subject to any disclaimer, the term of this patent is extended or adjusted under 35 U.S.C. 154(b) by 307 days.

(21) Appl. No.: 13/106,988

(22) Filed: May 13, 2011

(65) Prior Publication Data

US 2012/0291114 A1    Nov. 15, 2012

(51) Int. Cl.
*H04L 29/06* (2006.01)
*H04L 9/32* (2006.01)
*G06F 21/41* (2013.01)

(52) U.S. Cl.
CPC ............. *H04L 9/3234* (2013.01); *H04L 9/321* (2013.01); *H04L 63/0815* (2013.01); *H04L 63/205* (2013.01); *G06F 21/41* (2013.01); *H04L 63/0807* (2013.01)
USPC .................... 726/8; 726/26; 726/27; 713/172

(58) Field of Classification Search
CPC ...... H04L 63/0815; G06F 21/41; G06F 21/10

USPC ........................................................... 726/8
See application file for complete search history.

(56) References Cited

U.S. PATENT DOCUMENTS

| | | | |
|---|---|---|---|
| 6,826,696 B1 * | 11/2004 | Chawla et al. .................... 726/4 |
| 7,353,383 B2 * | 4/2008 | Skingle ......................... 713/156 |
| 7,496,954 B1 * | 2/2009 | Himawan et al. ................. 726/8 |
| 8,151,333 B2 * | 4/2012 | Zhu et al. .......................... 726/8 |
| 8,327,427 B2 * | 12/2012 | Soukup et al. .................... 726/8 |
| 2004/0250118 A1 * | 12/2004 | Andreev et al. ............... 713/201 |
| 2005/0144482 A1 * | 6/2005 | Anuszewski .................. 713/201 |
| 2005/0154887 A1 * | 7/2005 | Birk et al. ..................... 713/168 |
| 2009/0292927 A1 * | 11/2009 | Wenzel et al. ................ 713/185 |

* cited by examiner

*Primary Examiner* — Mohammad L Rahman
(74) *Attorney, Agent, or Firm* — Marshall, Gerstein & Borun LLP (57) ABSTRACT A single sign-on (SSO) system uses simple one-to-one trust relationships between individual applications and an SSO service to extend log in services from one application to another. Each application retains its own login policies and can separately make a decision whether to trust the SSO request or challenge the user for login credentials. By structuring the SSO system to use simple identity mapping, there is no requirement for consolidating user identity records from multiple applications into a single database with its attendant overhead and dependency risks.

18 Claims, 5 Drawing Sheets

ND APPLICATIONS

TECHNICAL FIELD

This patent is directed to authentication and authorization of a user in a computer environment. Specifically, it is directed to providing single sign-on services between multiple computer applications.

BACKGROUND

This Background is intended to provide the basic context of this patent application and it is not intended to describe a specific problem to be solved.

When traversing between security domains, for example, a virtual private network and a database, or between a first database and a second database, one simple way of ensuring security is to require a user to login with original credentials at each security domain. That is, to require the user to enter an ID and password/token when accessing each network, database, application, etc. While this maintains security at the most granular level, it causes users the inconvenience of repeatedly logging in at the various boundaries. Further, it increases support costs for recovering lost or forgotten user credentials and may even threaten security as users resort to simple, common passwords or even worse, writing login and password information on sticky notes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A single sign on (SSO) system manages trust in a manner that allows a successful login by a user on one application or security domain to be used as a basis for trust in accessing another application or security domain. Some systems, such as Kerberos, require the user log into a credential system that each application trusts, and then the credential system issues service tickets to the requested applications to allow admittance by the user.

An SSO system in accordance with the current disclosure uses a single sign on service to establish trust with each application in the system. Then, as a user successfully logs in to an application, the application stores a private credential associated with the user on the SSO service. When the user is later presented to the application with an identity verification supplied by the SSO service, the application can retrieve the stored credentials from the SSO system and confirm the user's access rights. In contrast to Kerberos and other SSO systems, this process allows each application or security domain to retain and enforce its own login policies, such as password expiration and authentication strength.

Further, the current system supports self-provisioning of each relationship mapping between identities of the same user in different applications, thereby avoiding the significant cost and overhead associated with separate administration of a SSO service that traditionally requires each identity mapping to be pre-configured before SSO service can be used.

DETAILED DESCRIPTION OF THE INVENTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term" is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
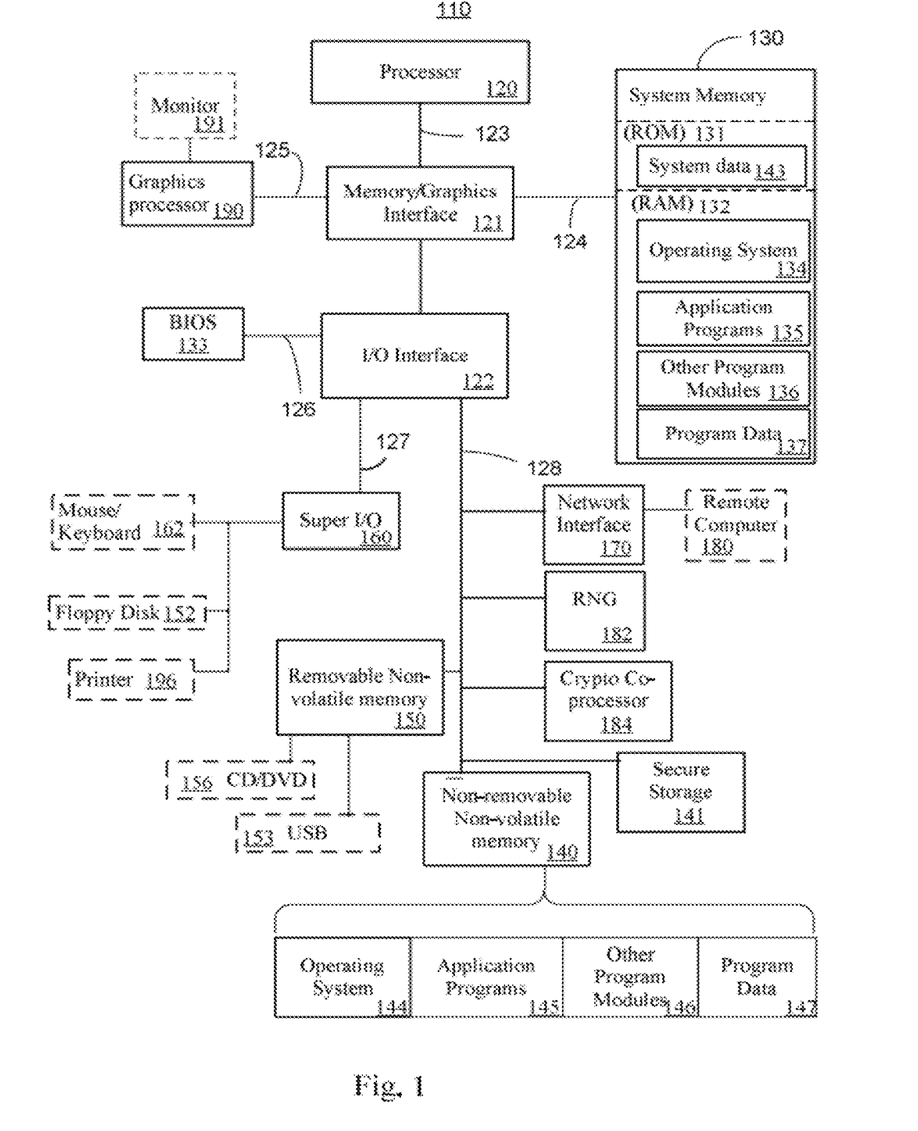
FIG. 1 is an illustration of a computing device.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121 and an I/O interface 122. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer executable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices or other physical storage elements that physically embody electronic data and excludes any propagated media such as radio waves or modulated carrier signals.

The system memory 130 includes computer storage media in the form of volatile and/or nonvolatile memory such as read only memory (ROM) 131 and random access memory (RAM) 132. The system ROM 131 may contain permanent system data 143, such as computer-specific data that may be used as a seed for generating random numbers or nonces, for example, for use in authentication and authorization applications associated with single sign-on applications. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a bus 127, such as a low pin count (LPC) bus, in some embodiments. Various embodiments of the super I/O chip 160 are widely available in the commercial marketplace. In one embodiment, bus 128 may be a Peripheral Component Interconnect (PCI) bus.

The computer 110 may also include other removable/non-removable, volatile/nonvolatile computer storage media. By way of example only, FIG. 1 illustrates a hard disk drive 140 that reads from or writes to non-removable, nonvolatile magnetic media. The hard disk drive 140 may be a conventional hard disk drive.

Removable media, such as a universal serial bus (USB) memory 153, firewire (IEEE 1394), or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical communication ports to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet. The remote computer 180 may also represent a computer or computers hosting application programs that are part of a single sign on system or that are part of a PKI infrastructure, such as a certificate authority (CA).

A cryptographic co-processor 184 may be used for cryptographic functions, including encryption and hashing functions, such as those used in creating digests or hashes, and encrypted data as described further below. Cryptographic co-processors, or cryptographic unit are commercially available, such as the IBM CEX3C/4765.

A random number generator (RNG) 182 may be used to generate random or pseudo-random numbers for use in generating symmetric keys, nonces, and the like. The RNG 182 may be incorporated in the cryptographic co-processor 184 or may be a separate component.

A secure storage media 141, such as a smart card or other tamper-resistant memory, may be used to store authentication data, private PKI keys and symmetric keys. In some embodiments, for example, when the secure storage media is a smart card, the cryptographic coprocessor 184 and random number generator 182 may be incorporated in the smart card.

Figure 2:
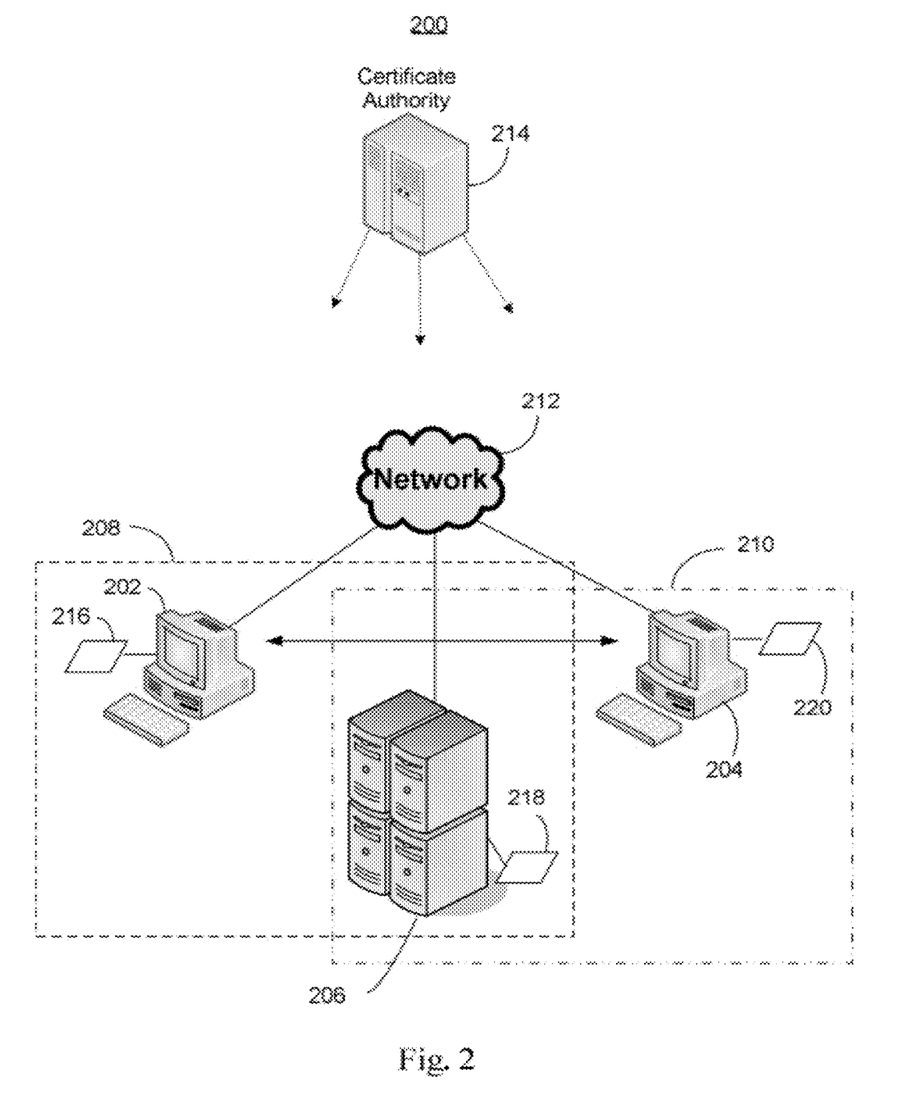
FIG. 2 is an illustration of a computing environment supporting single sign on (SSO)

FIG. 2 is an illustration of a computing environment 200 supporting single sign-on (SSO). The computing environment may include a first computer 202 and a second computer 204. Each computer may have a trust relationship with the SSO server 206. The first and second computer 202, 204 may each host one or more applications 216, 220. The applications 216, 220 may include, but are not limited to, client software, mobile applications, e-mail applications, social network programs, sales support programs, virtual private networks (VPNs), backend databases, etc. A characteristic of such programs or applications may be that they each require some login or authentication process before a user is allowed to access its program or data. For simplicity, each computer 202 and 204 is shown hosting one application. In practice, more than one application may be hosted on a single computer and still use the SSO techniques described.

The SSO server 206 may host an SSO service 218 or application that supports transparent logging in by a user meeting certain criteria transiting between the first application 216 and the second application 220. Of course, the SSO service 218 may support this single sign-on service between a multitude of separate applications. The SSO server 206 may be a known physical device, such as a server at an enterprise location. However, the SSO server 206 may be a cloud entity that simply provides the SSO service 218 and the physical location and implementation of the SSO server 206 may be unknown and, for the purpose of the implementation of the service, not of particular interest.

The user may be logged into the first application 216. The SSO service 218 may allow the user to access the second application 220 after certain criteria are met as will be explained in more detail below. An example of such activity may be a user accessing a corporate network via a virtual private network (VPN). Once the user's identity is confirmed at the VPN (the first application), the user may wish to access a corporate email system (the second application). Even though the VPN and the email account separately require presentation of login information, the use of the techniques described herein may allow the user to pass between the two applications without separately logging into each as depicted by the arrow between computers 202 and 204 in FIG. 2. In other embodiments, the applications between which SSO service is established may be any combination of financial databases, corporate databases, sales databases, email services, social network applications, web services, etc.

A trust relationship 208 may be built between the application 216 on the first computer 202 and the SSO service 218. One reason for trust between entities is the verification of messages sent between those entities. Further descriptions of such use are found below. Similarly, a trust relationship 210 may be built between the application 220 on the second computer 204 and the SSO service 218. One mechanism for establishing trust is a public key infrastructure or PKI. PKI systems are well known, but briefly, all participants agree to trust a domain trust provider in the form of a Certificate Authority or CA, that guarantees the identity of its participating computers and/or users. Each participant is issued private keys for their own use and public keys for use by others when authenticating identities. Each party's public keys can be verified using certificates issued by the CA and signed by the CA's private key. Certificate Authority services can be maintained by in-house entities for corporate use, or may offered by public companies, such as Entrust, Verisign, and Microsoft.

Alternatively, particularly when all the applications are within a single domain, such as a corporation or agency, private, or symmetric, keys can be used for authentication and trust.

Because cryptographic authentication on an 'n×n' basis (everyone to everyone else) becomes unwieldy and difficult to administer, the techniques described herein require trust/authentication only between each application 216, 218 and the SSO service 218.

Figure 3:
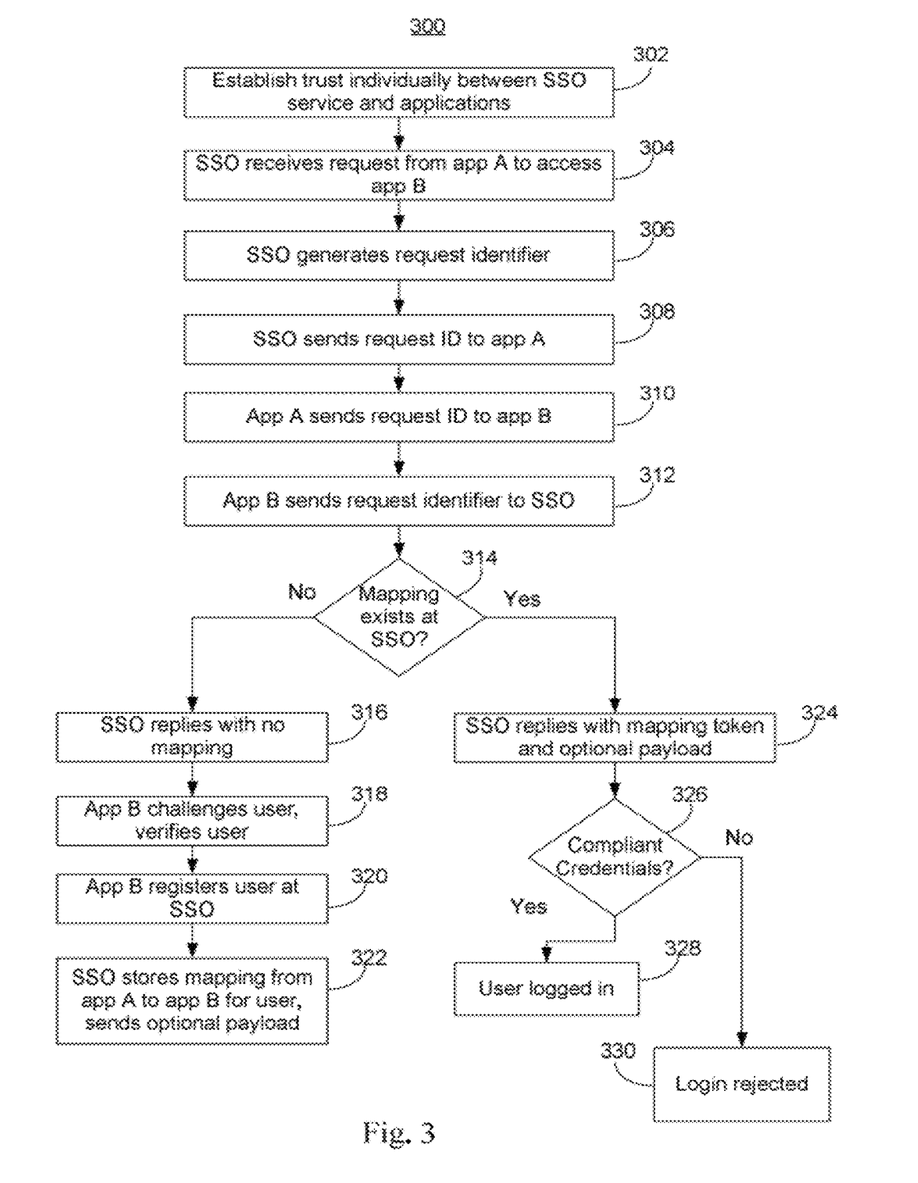
FIG. 3 is an illustration of a session between applications participating in the SSO system.

FIG. 3 illustrates a session 300 between applications participating in the SSO system 200. The session 300 may be implemented by software stored on computer readable storage media embodied in one or more databases or computer memories. Trust may be established between the SSO service 218 and the various applications participating in the SSO system (block 302). Trust is used in verifying three basic messages between the SSO and an application, a request for an identifier, a request for a mapping token, and a registration of a user by an application. An additional message returning a request from the SSO to an application may be verified, but since an incorrect identifier will presumably fail later in the process, this is not mandatory. Each of the messages will be discussed in more detail below. Trust may be established by the use of public keys in a PKI system or symmetric keys, as discussed above.

The SSO service 218 may receive a request from a first application 216, referred to afterwards for simplicity as application A 216 or app A 216 (block 304). The request may be associated with app A's desire to access another application 220 (app B). The request from app A 216 may include a user identifier, an application identifier, and an application instance identifier. The application instance identifier, such as a global universal identifier (GUID), may not only identify an application, such as a database, but a specific installation of the application, for example, the database instance at computer 202. A nonce or timestamp can be used with the request to protect from a replay attack.

The request may optionally also include an authentication strength indicator and a payload. The authentication strength indicator may tell the SSO what level of security is associated with the user's access to app A. For example, app A may only require a simple ID and password, or may require an authentication with a token such as a code key or a smart card (something you have and something you know), or may require a biometric verification, such as a fingerprint (something you are). The payload may be data that app A wishes to transfer to app B as part of the interaction. The payload may be database information or may be a link or URL that informs app B's activity after log in. Request ID, such as GUID, may be generated by App A, or it may be generated by the SSO service 218.

The SSO service 218 may then generate a request identifier (block 306). The request identifier or request ID may be a human readable string, or may be, a GUID.

A nonce, sequence number, or timestamp may be used separately or in combination to guarantee uniqueness of the message so that it may not be used again by app A to access app B or by a rogue application in a replay attack. In this scenario, the SSO is responsible for verifying the uniqueness of the nonce in a request ID. In some environments where a higher degree of trust may be present, such as within an enterprise, a request ID may not have a nonce and the request ID may be reused over a designated validity period. As discussed below, however, app B still has the opportunity to evaluate the request ID and the resulting log in information make its own determination about continuing the process for a given request ID.

Once generated, the SSO service 218 may send the request ID back to the requesting party, in this example, app A 216 (block 308).

App A 216 may then send the request ID directly to app B 220 (block 310). The request ID may be part of a standard message protocol, such as IP over port 80, or may use a proprietary messaging scheme.

App B 220 may then send the request ID to the SSO service 218 (block 312). The SSO service 218 may determine if app B 220 has previously stored mapping information on which user id in app A corresponds to which user id in app B (block 314). If no mapping exists, the branch to block 316 may be taken. Because the SSO service 218 does not know the intended target of app A, the SSO service 218 does not have apriori knowledge that a mapping for app A's intended target exists or not.

When no mapping exists, the SSO service 218 replies to app B 220 that no mapping exists (block 316). App B will challenge the user to present log in credentials and verify the user identity for itself, using its own locally maintained user database (block 318). If the user cannot complete the login, the process ends (not depicted).

When the user successfully logs in to app B 220, app B sends user registration data to the SSO service 218 (block 320). The SSO service 218 will store the information for use by app B in conjunction with a later log in attempt. Rather than have app B 220 (or app A 216) store all its own mapping data, the SSO service 218 can consolidate different mappings and relieve the individual applications from the overhead. This self-registration capability substantially reduces the overhead associated with installing and maintaining the SSO service, particularly when compared to other prior art SSO services.

After app B 220 registers the user, the SSO service 218 will store the registration data and forward any optional payload associated with the initial registration request (block 322).

Returning to block 314, when a mapping has been previously created, as shown immediately above, execution may follow the 'yes' branch. The SSO service 218 will, when available, return a mapping token to app B 220 (block 324), as well as any payload deposited at the SSO service 218 during the request process. The request ID supplied by the SSO service 218 to app A 216 is presented by app B 220 back to the SSO Service 218. Because app B 220 has the request ID, and there is a trust relationship between app B 220 and the SSO Service 218, the SSO Service 218 provides the mapping token with some confidence that the transaction is genuine. The request ID may serve as an index at the SSO Service 218 for accessing information associated with that particular request ID, such as, but not limited to, the identifier of the original application, the original application authorization strength, the transaction identifier, and the optional payload. The mapping token will typically also include information originally supplied by app B as discussed at block 320. Such information may include a hash of the user's current password or another additional data app B wishes to store. With respect to the hash of the user's current password, app B merely has to compare it to a stored version of the current password. If the two match, the login may be approved, pending other criteria, as discussed immediately below. After receiving the mapping token, app B 220 may examine the contents to determine if the credentials are compliant to a current log in policy (block 326).

Examples of such a determination made by app B 220 may be based only on its own login and security requirements and may include, but are not limited to: are all certificates valid, is the registration outdated (too old), has the application (in this example, app A 216) been blocked, has the user been blocked since registering, is the user's password too old and a new original login is required, does the authentication strength meet current requirements, etc. To expand on authentication strength, when app B originally registered it may have used an ID and password. Since the time of that registration, app B may have increased its requirement to ID, password and token. Because the authentication strength is now inadequate, app B 220 may reject the SSO login and require an original login by the user. As can be seen, even though the applications cooperate in providing single sign-on services, each application is ultimately in charge of whether to accept or reject the login based on its own criteria, in contrast to other SSO systems that delegate authority to the third party security arbiter.

If the credentials are acceptable, the user may be logged in (block 328). If the credentials are not acceptable, the SSO login may be rejected (block 330). The user may be offered the opportunity to log in directly with app B 220, app B 220 may send an error message, or app B 220 may simply cease the process without error message.

The above illustration uses a single requesting application and a single responding application. In practice, any number of applications can be enrolled and have mappings established between any two applications, and any application can assume both roles.

In some embodiments, the SSO service may be able to collapse mappings. For example, take a user who is mapped from app A to app B and from app C to app D. When the user attempts to access app C from app A, the mapping will fail and the user will be asked to log into app C. After successfully logging in, app C may call the SSO Service registration method for creating the app A to app C mapping. The SSO Service will recognize that the mappings are for the same user and may collapse the two original mappings to one user record. That is, given mappings between app A and app B, and app B and app C, an implied mapping from app A to app C can be created.

In some other scenarios, if the SSO Service is unavailable or non-responsive, an originating app, app A 216 in our examples above, may simply send a null or default request ID to app B 220. App B will not be able to verify the mapping token, with or without access to the SSO service 218 and will then simply ask the user to log in directly. That is, given an incorrect request ID, the contacted application can simply revert to its own security policy.

When a new application is added to the SSO system 200, the application is given keys (either PKI or symmetric) and an application identifier, as discussed above. In a web service-based system, each application will need to be able to, at a minimum, call three web methods: i) registration of user tokens, ii) requesting/retrieving request identifiers, and iii) retrieving mapping tokens after receiving a request identifier. In one embodiment, mapping token data may be pre-loaded so that the initial registration process by each application is avoided, although later re-registrations may be required as local policies may require. To mitigate spoofing of messages between an application and the SSO service 218 and particular message contents, especially request identifiers, may be signed, encrypted, or both.

Figure 4:
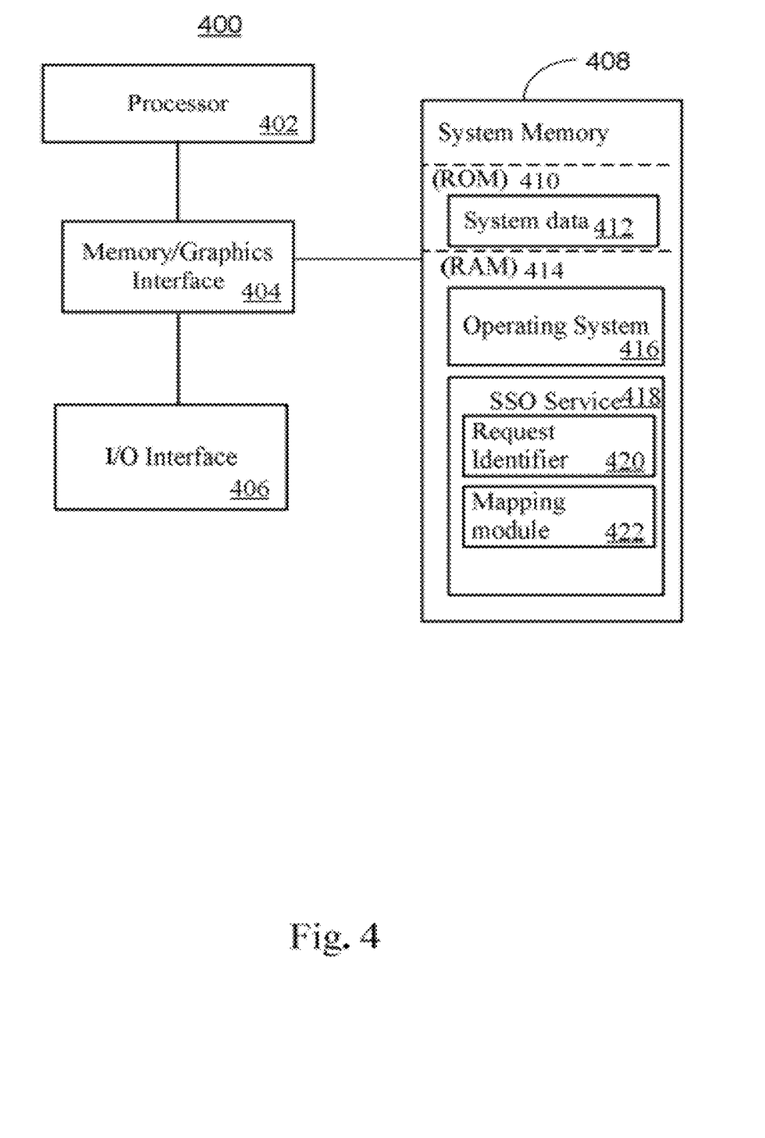
FIG. 4 is a simplified illustration of an SSO server.

FIG. 4 is a simplified illustration of a server supporting a single sign-on (SSO) server 400 showing the application modules that may be associated with providing a single sign-on (SSO) service 418. The server 400 may include a processor 402, a memory graphics interface 404, and I/O interface 406 as well as other exemplary hardware and software shown in FIG. 1. The SSO server 400 may also include system memory 408 with ROM 410 having system data 412 and RAM 414 having the executing versions of the operating system 416 and the SSO service application 418. The SSO service application 418 may include, but is not limited to a request identifier module 420 that provides a request identifier responsive to a message from a first application and a mapping module 422 that provides a mapping token to the second application responsive to a message from the second application including the request identifier. Of course, all executable code operating in RAM 414 may be loaded from a non-volatile storage media, such as media 140 of FIG. 1.

The SSO service 418 is illustrated as running on a standalone server 400, but in operation, the SSO service 418 may be hosted by virtually any network connected computing device capable of supporting the functions associated with the SSO service 418, with or without other system utilities, network or user application programs, or security functions. As computing device technology and network technology continue to evolve, the network connected computing device could include, but is not limited to, a server, a desktop computer, a laptop computer, a smart phone, a personal digital assistant (PDA), a tablet computer and a cloud service.

Figure 5:
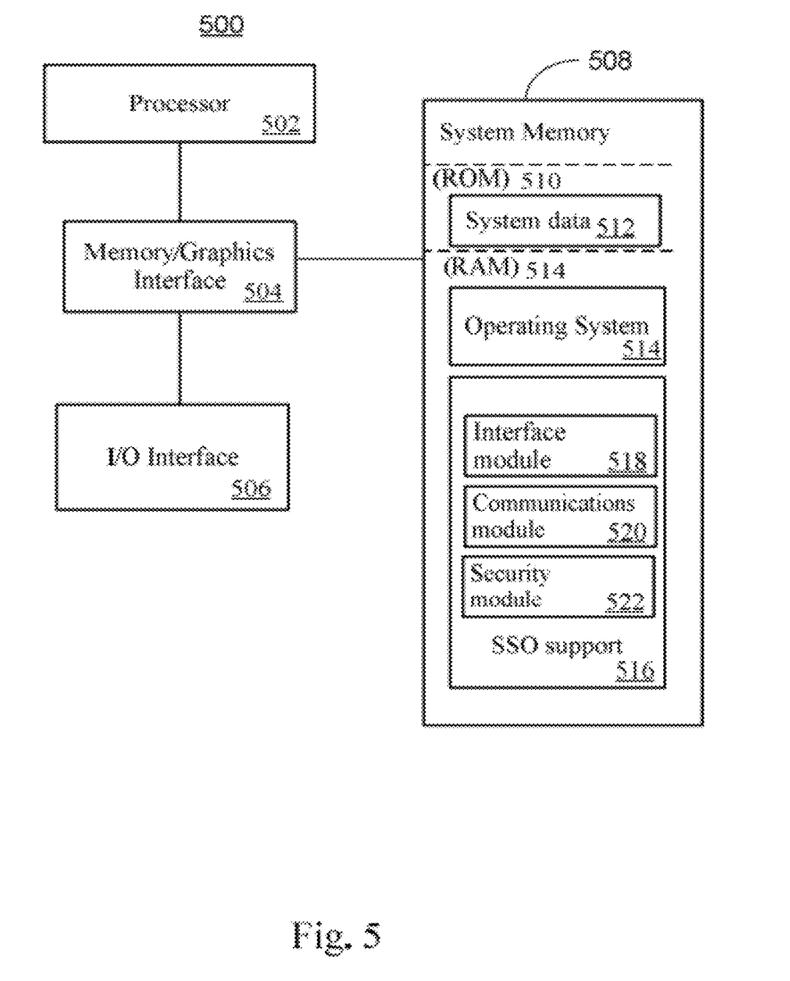
FIG. 5 is a simplified illustration of an exemplary application server.

FIG. 5 is an illustration of an exemplary application server 500. The application server 500 may illustrate a hardware and software environment suitable for participating in the single sign-on system shown in FIG. 2. The application server 500 may illustrate either application server 202 or 204 in FIG. 2. Because participating applications and their host servers may provide bi-directional services between applications, that is either may request access to the other, the illustrated application server 500 can represent either application server 202 or 204. Although the term application server 500 is used for illustration, the application server 500 may be any computing device capable of supporting the SSO functions described below. Such computing devices may include, but are not limited to, a server, a desktop computer, a laptop computer, a smart phone, a personal digital assistant (PDA), a tablet computer and a cloud service. The applications themselves may be standalone applications, such as a small database or client application, may be distributed applications such as large databases, web methods, or webservices, or may be cloud functions.

The application server 500 may include, among other hardware and software, a processor 502, a memory/graphics interface 504, an I/O interface 506 and system memory 508. The system memory may have ROM 512 with system data, such as a BIOS, and RAM 514. The RAM may include operating instances of the operating system 514 and one or more modules supporting SSO activity for an application. Of course, all executable code operating in RAM 514 is loaded from a non-volatile storage media, such as media 140 of FIG. 1. The SSO support 516 may include an interface module 518 for accepting a request from a user to access another application and a communications module 520 for generating a communication session with the SSO service 218 for sending the request to and receiving the request identifier from the SSO service 218. The exemplary application server 500 may also include a security module that sends the request identifier received from a requesting application to the SSO service 218. The security module may also receive the response from the SSO service 218 and either process the mapping token as discussed above or require an original log in.

In summary, various aspects of the disclosed embodiments include:

1. A method of authenticating a user accredited in an application (app A) (216) to another application (app B) (220), the method comprising:
receiving (304) at the SSO service (218) a request from app A (216) to create a SSO request, the request including a user identifier and an application identifier;
generating (306) a request identifier at the SSO service (218);
providing (308) the request identifier to app A (216) for use by app A (216) in contacting app B (220);
receiving (312), at the SSO service (218), from app B (220) the request identifier provided to app A (216);
verifying (314) at the SSO service (218) that a mapping exists for app B (220);
providing (324) a mapping token to app B (220), the mapping token corresponding to a previous registration of the user by app B (220) with the SSO service (218);
extracting (326) login information from the mapping token at app B (220); and
accepting (328) the login information when the login information meets a local security policy at app B (220).

2. An additional aspect of aspect 1, wherein:
establishing the trust relationship comprises mutual authentication using a shared secret or a public key infrastructure.

3. An additional aspect of any of aspects 1-2, wherein receiving at the SSO service the request from app A comprises receiving an authentication strength identifier.

4. An additional aspect of any of aspects 1-3, further comprising:
establishing a trust relationship between a single sign-on (SSO) service and app A; and
establishing a trust relationship between the SSO service and app B, wherein:
establishing the trust relationship comprises mutual authentication using a shared secret or a public key infrastructure.

5. An additional aspect of any of aspects 1-4, wherein the request includes an application instance identifier.

6. An additional aspect of any of aspects 1-5, wherein providing the mapping token to app B comprises providing the mapping token and additional data stored by app B at the SSO service.

7. An additional aspect of any of aspects 1-6, wherein generating a request identifier comprises generating a nonce to include with the request identifier.

8. An additional aspect of any of aspects 1-7, further comprising authenticating the user between app B and app A using the mapping token.

9. A system (200) of one or more computers (202) (204) (206) coupled by a network (212) comprising:
i) an SSO service (218) embodied as a web service on a computer server (206), the computer server (206) comprising:
a hardware communication service (170) coupled to a physical network (212) that supports communication between the computer server (206) and at least one other physical computer (202); and
a secure storage facility (141) that holds authentication-related data from a plurality of applications external to the computer server;
a request identifier module (420) that provides a request identifier responsive to a message from a first application (216), the message requesting access to a second application;
a mapping module (422) that stores mapping tokens with information related to a relationship between user identities in the first application and the second application and provides the mapping token responsive to a second message received from the second application, the second message including the request identifier previously sent to the first application and forwarded to the second application by the first application;
ii) the first application (216) running on a computing device (202) coupled to the network supporting the first application, the first application (216) comprising:
an interface module (518) that accepts a request to access the second application; and
a communications module (520) that generates a communication session with the SSO service (218) that forwards the request to the SSO service and that receives the request identifier from the SSO service (218) responsive to the request;

iii) the second application (220) running on the computing device (202) or another computing device (204), the second application (220) comprising:
a second interface module (518) that receives the request identifier from the first application (216); and
a security module (522) that sends the request identifier in the second message via the second interface module (518) to the SSO service (218) over the network (212), that when the mapping token is present at the SSO service (218), receives the mapping token from the SSO service (218), the mapping token including login information previously stored by the second application (220) corresponding to a previous login at the second application (220) via the first application (216), wherein the security module (522) applies information in the mapping token to a login process, and when the information in the mapping token satisfies a login requirement, provides the user access to the second application (220).

10. An additional aspect of aspect 9, wherein the request identifier module is programmed to retrieve a nonce from the cryptographic module for inclusion in the request identifier.

11. An additional aspect of any of aspects 9-10, wherein the request identifier module is programmed to store a user identifier received from the first application and to generate the request identifier.

12. An additional aspect of any of aspects 9-11, wherein communication between the SSO service and the first application, and communication between the SSO service and the second application, are cryptographically verified for source and integrity.

13. An additional aspect of any of aspects 9-12, wherein the mapping token contains a hash of the user password at the second application.

14. A computer-readable storage media (140) having computer executable instructions for executing on a processor (120) of a computer (110) a method of performing authentication of a user logged in to a first application (216) requesting access to a second application (220), the method comprising:
challenging the user for authentication credentials when a mapping token that stores login information associated with the first application (216) and that was previously received from the second application (220) is not available from a single sign-on service (218);
logging the user into the second application (220) when the authentication credentials are satisfactory; and
sending user information and application information to the single sign-on service (218) for use in generating the mapping token for subsequent sign-on access by the user of the first application (216) when accessing the second application.

15. An additional aspect of aspect 14, wherein the computer executable instructions further comprise:
receiving a request identifier at the second application indicating the user wishes to login to the second application;
sending the request identifier to the single sign-on service;
receiving the mapping token from the single sign-on service;
evaluating information in the mapping token to extract login information regarding the user; and
applying a local security or login policy to the login information to determine whether to allow the user automatic access to the second application.

16. An additional aspect of any of aspects 14-15, wherein the information in the mapping token includes one of a transaction identifier, a user identifier, a first application identifier, and a hash of a password corresponding to a password previously provided by first application to the second application.

17. An additional aspect of any of aspects 14-16, wherein the information in the mapping token further includes an authentication strength indicator corresponding to a login strength of the user at the first application.

18. An additional aspect of any of aspects 14-17, wherein the information in the mapping token further includes a payload provided by the first application to the single sign-on service.

19. An additional aspect of any of aspects 14-18, wherein the computer executable instructions further comprise requiring the user to log in manually when the local security or login policy indicate automatic access to the second application fails.

20. An additional aspect of any of aspects 14-19, wherein the computer executable instructions further comprise providing the mapping token by the single sign-on service when accessing another application.

To the extent that any meaning or definition of a term in this document conflicts with any meaning or definition of the same term in a document incorporated by reference, the meaning or definition assigned to that term in this document shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A method of authenticating a user accredited in an application (app A) to another application (app B), the method comprising:
receiving, at a single sign-on (SSO) service, a request from app A to access app B, the request including a user identifier and an application identifier;
generating, at the SSO service, a request identifier and a nonce;
providing the request identifier and the nonce to app A for use by app A in contacting app B;
receiving, at app B, the request identifier and the nonce from app A;
receiving, at the SSO service, from app B the request identifier and the nonce provided to app A;
verifying, at the SSO service, that a mapping exists for app B;
providing, from the SSO service, a mapping token to app B, the mapping token corresponding to a previous registration of the user by app B with the SSO service;
extracting, at app B, login information from the mapping token; and
accepting, at app B, the login information when the login information meets a local security policy.

2. The method of claim 1, wherein:
establishing a trust relationship comprises mutual authentication using a shared secret or a public key infrastructure.

3. The method of claim 1, wherein receiving at the SSO service the request from app A comprises receiving an authentication strength identifier.

4. The method of claim 1, further comprising:
establishing a trust relationship between the SSO service and app A; and establishing a trust relationship between the SSO service and app B, wherein:
establishing the trust relationship comprises mutual authentication using a shared secret or a public key infrastructure.

5. The method of claim 1, wherein the request includes an application instance identifier.

6. The method of claim 1, wherein providing the mapping token to app B comprises providing the mapping token and additional data stored by app B at the SSO service.

7. The method of claim 1, further comprising authenticating the user between app B and app A using the mapping token.

8. A system of one or more computers coupled by a network comprising:
i) a single sign-on (SSO) service embodied as a web service on a computer server, the computer server comprising:
a hardware communication service coupled to a physical network that supports communication between the computer server and at least one other physical computer; and
a secure storage facility that holds authentication-related data from a plurality of applications external to the computer server;
a request identifier module that provides a request identifier from the SSO service that is responsive to a message from a first application, the message requesting access to a second application, the request identifier module being programmed to retrieve a nonce from a cryptographic module for inclusion in the request identifier;
a mapping module that stores mapping tokens with information related to a relationship between user identities in the first application and the second application and provides the mapping token responsive to a second message received from the second application, the second message including the request identifier previously sent from the SSO service to the first application and forwarded to the second application by the first application;
ii) the first application running on a computing device coupled to the network supporting the first application, the first application comprising:
an interface module that accepts a request to access the second application; and
a communications module that generates a communication session with the SSO service that forwards the request to the SSO service and that receives the request identifier from the SSO service responsive to the request;
iii) the second application running on the computing device or another computing device, the second application comprising:
a second interface module that receives the request identifier from the first application; and
a security module that sends the request identifier in the second message via the second interface module to the SSO service over the network, that when the mapping token is present at the SSO service, receives the mapping token from the SSO service, the mapping token including login information previously stored by the second application corresponding to a previous login at the second application via the first application, wherein the security module applies information in the mapping token to a login process, and when the information in the mapping token satisfies a login requirement, provides the user access to the second application.

9. The system of claim 8, wherein the request identifier module is programmed to store a user identifier received from the first application and to generate the request identifier.

10. The system of claim 8, wherein communication between the SSO service and the first application, and communication between the SSO service and the second application, are cryptographically verified for source and integrity.

11. The system of claim 8, wherein the mapping token contains a hash of the user password at the second application.

12. A non-transitory computer-readable storage media having computer executable instructions for executing on a processor of a computer a method of performing authentication of a user logged into a first application and requesting access to a second application, the method comprising:
challenging, at the second application, the user for authentication credentials when a mapping token that stores login information associated with the first application and that was previously received from the second application is not available from a single sign-on (SSO) service;
logging the user into the second application when the authentication credentials are satisfactory; and
sending, from the second application, user information and application information to the SSO service for use in generating the mapping token for subsequent sign-on access by the user of the first application when accessing the second application, wherein the information in the mapping token includes one of a transaction identifier, a user identifier, a first application identifier, and a hash of a password corresponding to a password previously provided by first application to the second application.

13. The computer-readable storage media of claim 12, wherein the computer executable instructions further comprise:
receiving a request identifier at the second application indicating the user wishes to login to the second application;
sending the request identifier to the SSO service;
receiving the mapping token from the SSO service;
evaluating information in the mapping token to extract login information regarding the user; and
applying a local security or login policy to the login information to determine whether to allow the user automatic access to the second application.

14. The computer-readable storage media of claim 13, wherein the information in the mapping token further includes an authentication strength indicator corresponding to a login strength of the user at the first application.

15. The computer-readable storage media of claim 14, wherein the information in the mapping token further includes a payload provided by the first application to the SSO service.

16. The computer-readable storage media of claim 12, wherein the computer executable instructions further comprise requiring the user to log in manually when the local security or login policy indicate automatic access to the second application fails.

17. The computer-readable storage media of claim 12, wherein the computer executable instructions further comprise providing the mapping token by the SSO service when accessing another application.

18. The method of claim 1, wherein providing the mapping token from SSO service to app B comprises providing the mapping token from SSO service to app B via a network.

* * * * *